(12) United States Patent
Amor (10) Patent No.: US 8,539,685 B2
(45) Date of Patent: Sep. 24, 2013

(54) INTEGRATED SURVEYING AND LEVELING

(75) Inventor: Miguel Amor, Thornton, CO (US)

(73) Assignee: TRIMBLE Navigation Limited, Sunnyvale, CA (US)

( * ) Notice: Subject to any disclaimer, the term of this patent is extended or adjusted under 35 U.S.C. 154(b) by 435 days.

(21) Appl. No.: 13/010,071

(22) Filed: Jan. 20, 2011

(65) Prior Publication Data

US 2012/0186088 A1 Jul. 26, 2012

(51) Int. Cl.
*G01C 15/00* (2006.01)
(52) U.S. Cl.
USPC ............... 33/290; 33/228; 33/276; 33/292
(58) Field of Classification Search
USPC ............ 33/228, 276, 277, 281, 282, 283, 33/284, 290, 292, 293; 356/3; 702/166
See application file for complete search history.

(56) References Cited

U.S. PATENT DOCUMENTS

| | | | |
|---|---|---|---|
| 3,549,897 A | 12/1970 | Blake | |
| 4,136,955 A | 1/1979 | Aeschlimann et al. | |
| 4,146,927 A | 3/1979 | Erickson et al. | |
| 4,166,406 A | 9/1979 | Maughmer | |
| 4,205,385 A | 5/1980 | Erickson et al. | |
| 4,664,519 A | 5/1987 | Hullein et al. | |
| 4,688,933 A | 8/1987 | Lapeyre | |
| 4,714,339 A | 12/1987 | Lau et al. | |
| 4,717,251 A | 1/1988 | Wells et al. | |
| 5,000,585 A | 3/1991 | Hoffmann et al. | |
| 5,027,521 A * | 7/1991 | Del Giorgio | ............... 33/281 |
| 5,196,900 A | 3/1993 | Pettersen | |
| 5,235,181 A | 8/1993 | Durana et al. | |
| 5,471,218 A | 11/1995 | Talbot et al. | |
| 5,965,879 A | 10/1999 | Leviton | |
| 6,014,220 A * | 1/2000 | Kimura | ..................... 356/400 |
| 6,067,046 A | 5/2000 | Nichols | |
| 6,138,367 A | 10/2000 | Raby | |

(Continued)

FOREIGN PATENT DOCUMENTS

JP 2010151757 A * 7/2010

OTHER PUBLICATIONS

Feist, V., et al., "The New Digital Levels DiNi® 10 and DiNi® 20", English translation for "Die Total Level Station DiNi 10 T—Das erste digital Nivelliertachymeter", VR, Vermessungswesen und Rauordnung, Feb. 1996, pp. 1-7, vol. 58, No. 1, 22 total pages.

(Continued)

*Primary Examiner* — Richard A Smith
(74) *Attorney, Agent, or Firm* — Kilpatrick Townsend & Stockton LLP (57) ABSTRACT

A method of determining a position of a point in a local coordinate system using a survey instrument comprising an integrated optical total station and digital level includes measuring an angle associated with the point. The angle may be measured about a vertical axis of the survey instrument, and the vertical axis may be substantially aligned with a local gravity vector. The method also includes determining a distance between the survey instrument and the point using an electronic distance measuring device and measuring a difference in height between a horizontal axis of the survey instrument and the point using a leveling staff positioned relative to the point. The horizontal axis may be substantially orthogonal to the vertical axis. The method also includes determining the position of the point in the local coordinate system using the angle, the distance, and the difference in height.

20 Claims, 7 Drawing Sheets

(56) References Cited

U.S. PATENT DOCUMENTS

| | | |
|---|---|---|
| 6,333,511 B1 | 12/2001 | Talmi |
| 6,384,902 B1 | 5/2002 | Schneider |
| 6,450,267 B2 | 9/2002 | Ohtomo et al. |
| 6,453,569 B1 | 9/2002 | Kumagai et al. |
| 6,563,574 B2 | 5/2003 | Ohtomo et al. |
| 6,573,981 B2 * | 6/2003 | Kumagai et al. ............ 356/4.08 |
| 6,799,142 B2 | 9/2004 | Miyao et al. |
| 6,907,133 B2 | 6/2005 | Gotoh |
| 7,060,968 B1 | 6/2006 | Leviton |
| 7,127,822 B2 | 10/2006 | Kumagai et al. |
| 7,315,794 B1 * | 1/2008 | Willis ........................... 702/159 |
| 7,319,511 B2 | 1/2008 | Murai et al. |
| 7,441,340 B2 | 10/2008 | Hertzman |
| 7,589,313 B2 | 9/2009 | Nordenfelt et al. |
| 7,627,449 B2 | 12/2009 | Lin |
| 7,633,610 B2 | 12/2009 | Walser |
| 7,640,068 B2 | 12/2009 | Johnson et al. |
| 7,697,127 B2 | 4/2010 | Vogel et al. |
| 7,715,998 B2 | 5/2010 | Hayashi |
| 7,762,135 B2 | 7/2010 | Hertzman et al. |
| 7,830,501 B2 | 11/2010 | Kludas et al. |
| 7,930,835 B2 * | 4/2011 | Svanholm et al. ............. 33/290 |
| 7,946,044 B2 | 5/2011 | Kludas et al. |
| 7,947,944 B2 | 5/2011 | Talbot |
| 7,969,586 B2 | 6/2011 | Donath et al. |
| 2009/0192715 A1 * | 7/2009 | Gunsaulis et al. ................ 702/9 |

OTHER PUBLICATIONS

Feist, V., et al., "DiNi® 10 T—the First Digital Total Level Station", English translation for "Die neuen Digitalnivelliere DiNi 10 T und DiNi 20", VR, Vermessungswesen und Rauordnung, Apr. 1995, pp. 65-78, vol. 57, No. 2, 11 total pagesl.

* cited by examiner

FIG. 7

INTEGRATED SURVEYING AND LEVELING

FIELD OF INVENTION

The present invention relates generally to integrated surveying and leveling. More particularly, the present invention relates to using a survey instrument comprising an integrated optical total station and a digital level to obtain position information.

BACKGROUND

Various kinds of instruments are commonly employed in surveying, construction, and other applications to measure angles, distances, and elevations. For example, an optical total station is commonly used to measure angles and distances of objects or points of interest. Using the angles and distances, elevations of the objects or points can be computed using known techniques. As another example, a digital level is commonly used to measure elevations of objects or points of interest. Digital levels also commonly use imaging techniques to compute distances. The information from these instruments can be used to determine positions of the objects or points in a local or real world coordinate system.

While optical total stations and digital levels are commonly used to measure angles, distances, and elevations, improved instruments and methods are desired to increase measurement accuracy, reduce measurement time, and lower measurement costs.

SUMMARY

Embodiments of the present invention provide improved instruments and methods for measuring angles, distances, and elevations. As an example, an embodiment of the present invention provides a method of determining a position of a point in a local coordinate system using a survey instrument comprising an integrated optical total station and digital level. The method includes measuring an angle associated with the point. The angle may be measured about a vertical axis of the survey instrument, and the vertical axis may be substantially aligned with a local gravity vector. The method also includes determining a distance between the survey instrument and the point using an electronic distance measuring device and measuring a difference in height between a horizontal axis of the survey instrument and the point using a leveling staff positioned relative to the point. The horizontal axis may be substantially orthogonal to the vertical axis. The method also includes determining the position of the point in the local coordinate system using the angle, the distance, and the difference in height.

In accordance with another embodiment of the invention, a method of determining an angle, a distance, and an elevation of a point using a survey instrument comprising an integrated optical total station and digital level includes measuring an angle associated with the point. The angle may be measured about a vertical axis of the survey instrument. The method also includes determining a distance between the survey instrument and the point using an electronic distance measuring device and measuring a difference in height between a horizontal axis of the survey instrument and the point. The horizontal axis may be substantially orthogonal to a local gravity vector, and the difference in height may be measured using a leveling staff positioned relative to the point.

In accordance with another embodiment of the invention, a survey instrument comprising an integrated optical total station and digital level is configured to determine a position of a point in a local coordinate system. The survey instrument includes a first measuring module configured to measure an angle associated with the point about a vertical axis of the survey instrument and a first determining module configured to determine a distance between the survey instrument and the point using an electronic distance measuring device. The survey instrument also includes a second measuring module configured to measure a difference in height between a horizontal axis of the survey instrument and the point using a leveling staff positioned relative to the point. The horizontal axis may be substantially orthogonal to a local gravity vector. The survey instrument also includes a second determining module configured to determine the position of the point in the local coordinate system using the angle, the distance, and the difference in height.

Numerous benefits are achieved using embodiments of the present invention over conventional techniques. For example, some embodiments allow positions of objects or points to be determined with increased accuracy. In one embodiment, for example, a digital level portion of a survey instrument can be used to measure elevation. This can provide increased accuracy over conventional elevation computations using a total station alone. Also, a total station portion of the survey instrument can be used to measure distance. This can provide increased accuracy over conventional distance computations using a digital level alone. Some embodiments also reduce measurement time. In one embodiment, for example, a survey instrument comprising an integrated optical total station and digital level provides angle, distance, and elevation measurements nearly simultaneously. This can also lower measurement costs. Depending upon the embodiment, one or more of these benefits may exist. These and other benefits are described throughout the specification and more particularly below.

DETAILED DESCRIPTION

Embodiments of the present invention provide methods and apparatuses for determining positions of objects or points with increased accuracy and efficiency over conventional techniques. In an embodiment, for example, a method of determining a position of a point using a survey instrument comprising an integrated optical total station and digital level is provided. The method includes measuring an angle associated with the point, measuring a distance to the point, and measuring a difference in height between a horizontal axis of the survey instrument and the point. The measured values increase accuracy of position information compared to conventional techniques that compute one or more of these values. Also, the measurements can be performed nearly simultaneously thus increasing efficiency.

In another embodiment, a survey instrument comprising an integrated optical total station and digital level is provided. The survey instrument includes modules for measuring an angle associated with the point, measuring a distance to the point, and measuring a difference in height between a horizontal axis of the survey instrument and the point. The survey instrument also includes a module for determining the position of the point using the measured angle, the measured distance, and the measured difference in height. These and other embodiments are described more fully below.

Figure 1:
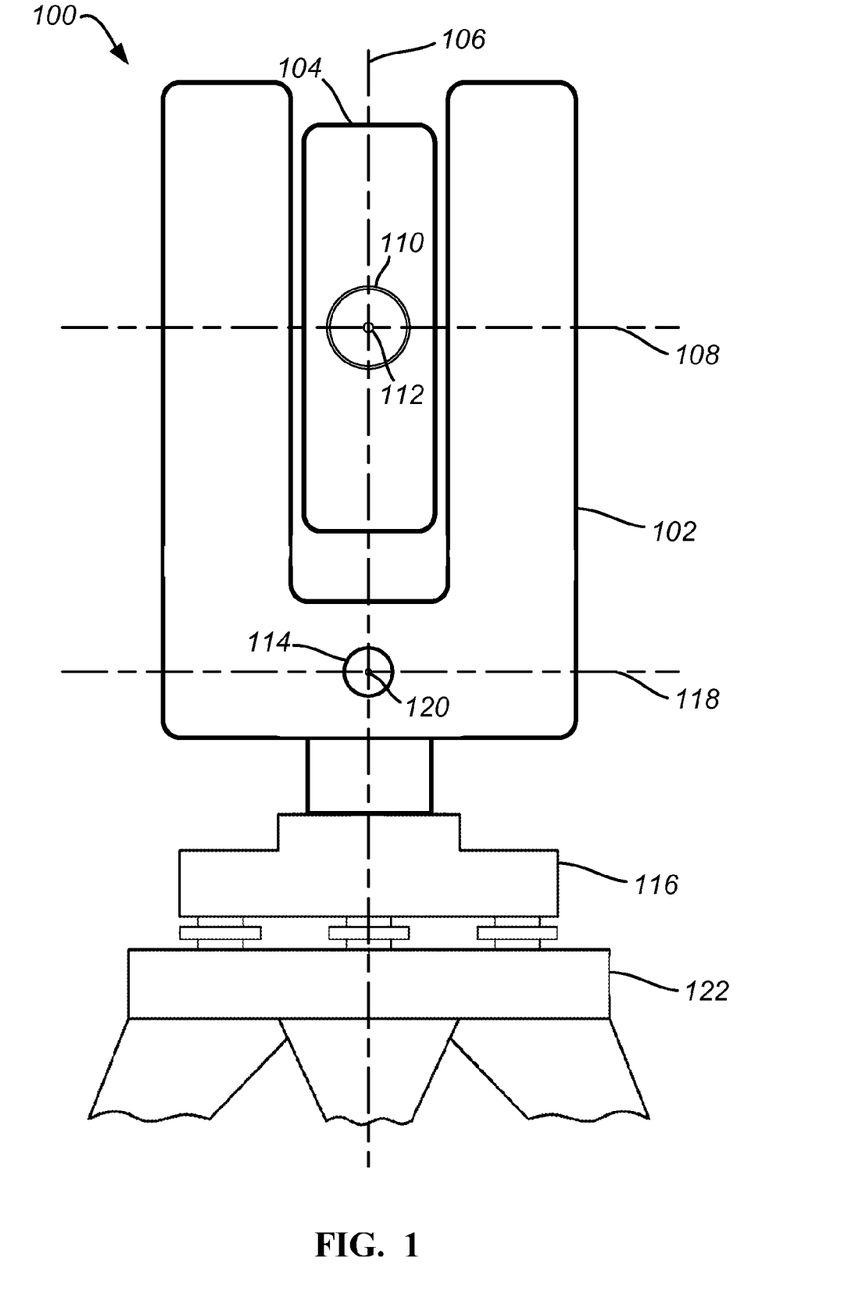
FIG. 1 is a simplified diagram of an exemplary survey instrument comprising an integrated optical total station and digital level in accordance with an embodiment of the present invention.

FIG. 1 is a simplified diagram of an exemplary survey instrument 100 comprising an integrated optical total station and digital level in accordance with an embodiment of the present invention. Survey instrument 100 includes an alidade 102 mounted on an adjustable tribrach 116. Adjustable tribrach 116 is typically configured to allow rotation of alidade 102 about a support axis 106. Support axis 106 is vertical and can be aligned with the local gravity vector by leveling alidade 102 in accordance with known techniques. Adjustable tribrach 116 is mounted on a support 122 such as a survey tripod of which only a portion is shown in FIG. 1.

Survey instrument 100 also includes a telescope unit 104. Telescope unit 104 is typically mounted for rotation about an elevation axis 108 that is orthogonal to support axis 106. Elevation axis 108 is horizontal and can be orthogonal to the local gravity vector when alidade 102 is leveled. Alidade 102 is typically rotatable about support axis 106 to any desired angle, and telescope unit 104 is typically rotatable about elevation axis 108 to any desired angle. This allows telescope 110 to be aimed at an arbitrarily-positioned external target to determine position information.

Telescope unit 104 includes a first telescope 110 with an optical center 112. Optical center 112 is typically a center of rotation of survey instrument 100 and is located at an intersection of support axis 106 and elevation axis 108. Telescope unit 104 may include a distance measurement module (e.g., an electronic distance measuring device) for measuring distance to a target remote from survey instrument 100.

Telescope unit 104 and first telescope 110 may be configured in a manner similar to a conventional optical total station to provide angle and distance measurements. As an example, first telescope 110 may be aimed at an object or point of interest and one or more angle sensors may be used to detect rotation of alidade 102 about support axis 106 and/or rotation of telescope unit 104 about elevation axis 108. Rotation about support axis 106 is generally determined relative to a reference (e.g., true north, magnetic north, or a point at a known location). Rotation about elevation axis 108 is generally determined relative to a horizontal plane orthogonal to the local gravity vector.

Alidade 102 may also include a second telescope 114 having an optical center 120. Optical center 120 may be at an intersection of support axis 106 and a horizontal axis 118 and may be a fixed distance from optical center 112 along support axis 106. Horizontal axis 118 is parallel to elevation axis 108 and can be orthogonal to the local gravity vector when alidade 102 is leveled.

Second telescope 114 may be configured in a manner similar to a conventional digital level to provide leveling (e.g., difference in height) measurements. For example, second telescope 114 and/or alidade 102 may include a pendulum to align second telescope 114 orthogonal to the local gravity vector. Second telescope 114 may also include an image sensor (e.g., a CCD or CMOS array) configured to obtain image information associated with a pattern (e.g., scale) on a leveling staff. The image information may be used to provide leveling measurements. As an example, a leveling staff may be positioned vertically directly above an object or point of interest. Second telescope 114 may be aimed at the leveling staff with horizontal axis 118 orthogonal to the local gravity vector. Image information obtained at an intersection between horizontal axis 118 and the leveling staff may be used to provide a difference in height between horizontal axis 118 and the object or point of interest. The difference in height is generally determined relative to a point having a known elevation, and thus measurements may include determining an elevation of the survey instrument relative to the known point, and determining an elevation of the object or point of interest relative to the survey instrument.

In an alternative embodiment, survey instrument 100 only includes first telescope 110 rather than first telescope 110 and second telescope 114 as illustrated in FIG. 1. In this embodiment, first telescope 110 may be configured to provide angle and distance measurements in a manner similar to a conventional optical total station and leveling measurements in a manner similar to a conventional digital level. In this embodiment, an image sensor in first telescope 110 may be used to obtain image information associated with a leveling staff. Telescope unit 104 or alidade 102 may include a pendulum used to align first telescope 110 orthogonal to the local gravity vector. One of ordinary skill in the art would recognize many variations, modifications, and alternatives.

Survey instrument 100 may also include an optical plummet to facilitate manual positioning of survey instrument 100 over a survey monument or other selected point in accordance with known techniques. The optical plummet may emit a light beam vertically downward that is coaxial with support axis 106 and/or the optical plummet may allow viewing the selected point through a small telescope. Survey instrument 100 may also include an inclination detector that supplies a signal representing inclination of alidade 102 in two mutually-orthogonal directions. The inclination detector can be used to set up the survey instrument 100 such that support axis 106 is plumb and elevation and horizontal axes 108, 118 are horizontal. The optical plummet and/or inclination detector may be used to station survey instrument 100 (e.g., determine a position of survey instrument 100 in the local coordinate system).

Survey instrument 100 may also include a controllable horizontal drive used to rotate alidade 102 about support axis 106 in response to control signals. A graduated ring may be fixed with respect to tribrach 116 and have markings that are detected by a horizontal angle sensor as alidade 102 is rotated. Alternatively, the horizontal angle sensor may be fixed with respect to tribrach 116 and be configured to detect markings on the graduated ring as alidade 102 is rotated.

Survey instrument 100 may also include controllable vertical drive used to rotate telescope unit 104 about elevation axis 108 in response to control signals. A graduated ring may be fixed with respect to telescope unit 104 and have markings that are detected by a vertical angle sensor as telescope unit 104 is rotated. Alternatively, the vertical angle sensor may be fixed with respect to telescope unit 104 and be configured to detect markings on the graduated ring as telescope unit 104 is rotated. A horizontal control with a manually-operable knob and a vertical control with a manually-operable knob may also be included to provide user inputs for control of the horizontal and vertical drive.

Survey instrument 100 may also include slip rings to provide for transmission of power from an external power supply to alidade 102 and communication of data and commands between alidade 102 and an external control unit. The slip rings may also provide for transmission of power from alidade 102 to telescope unit 104 and communication of data and commands between alidade 102 and telescope unit 104.

Survey instrument 100 may also include a radio module to provide wireless communication of data and commands with an external radio control unit. A battery may be provided to supply electrical power for survey instrument 100. Survey instrument 100 may also have a removable control unit with a keypad and/or other input device(s) and a display or control screen.

It should be appreciated that survey instrument 100 is presented herein merely as an exemplary survey instrument in accordance with an embodiment of the invention. It is not intended that embodiments of the present invention be limited to the configuration illustrated in FIG. 1 and/or described above. It is recognized that survey instruments having different configurations may be used in accordance with the methods and apparatuses of the present invention and that one of ordinary skill in the art would recognize many variations, modifications, and alternatives.

Figure 2:
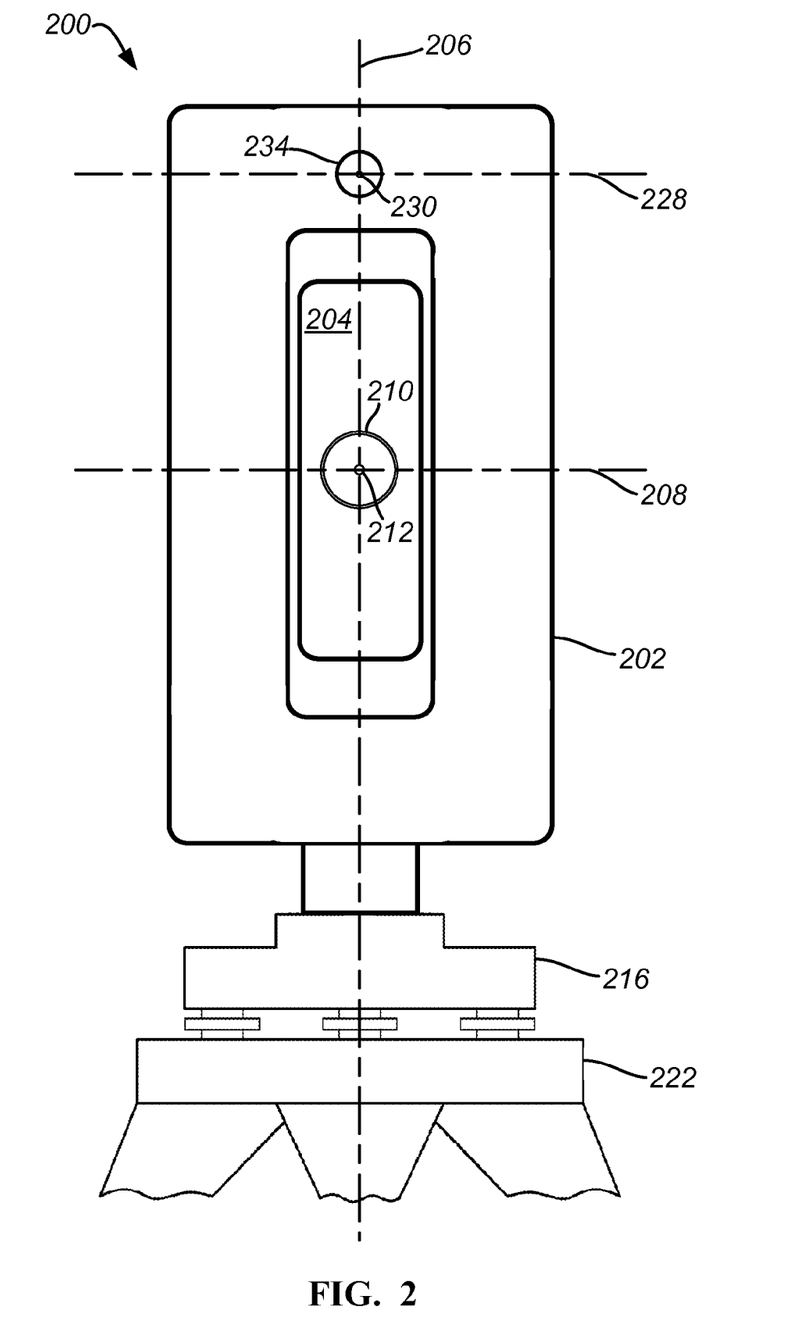
FIG. 2 is a simplified diagram of an exemplary survey instrument comprising an integrated optical total station and digital level in accordance with another embodiment of the present invention.

FIG. 2 is a simplified diagram of an exemplary survey instrument 200 comprising an integrated optical total station and digital level in accordance with another embodiment of the present invention. Survey instrument 200 is similar to survey instrument 100 illustrated in FIG. 1. Survey instrument 200 includes an alidade 202, an adjustable tribrach 216, a support 222, a telescope unit 204, and a first telescope 210. First telescope 210 includes an optical center 212 that may be a center of rotation of survey instrument 200 and is located at an intersection of support axis 206 and elevation axis 208. Each of these components may be configured in a manner similar to that of survey instrument 100 described above. Additionally, survey instrument 200 may include other components as described above with regard to survey instrument 100.

Survey instrument 200 also includes a second telescope 234 having an optical center 230. Optical center 230 may be at an intersection of support axis 206 and a horizontal axis 228 and may be a fixed distance from optical center 212 along support axis 206. Horizontal axis 228 is parallel to elevation axis 208 and can be orthogonal to the local gravity vector when alidade 202 is leveled.

Similar to second telescope 114 illustrated in FIG. 1, second telescope 234 may be configured in a manner similar to a conventional digital level to provide leveling measurements. In this embodiment, however, second telescope 234 is disposed in an upper portion of alidade 202. Such a configuration may be advantageous to allow remote control using Bluetooth, Wi-Fi, or similar communications technologies. One of ordinary skill in the art would recognize many variations, modifications, and alternatives.

Figure 3:
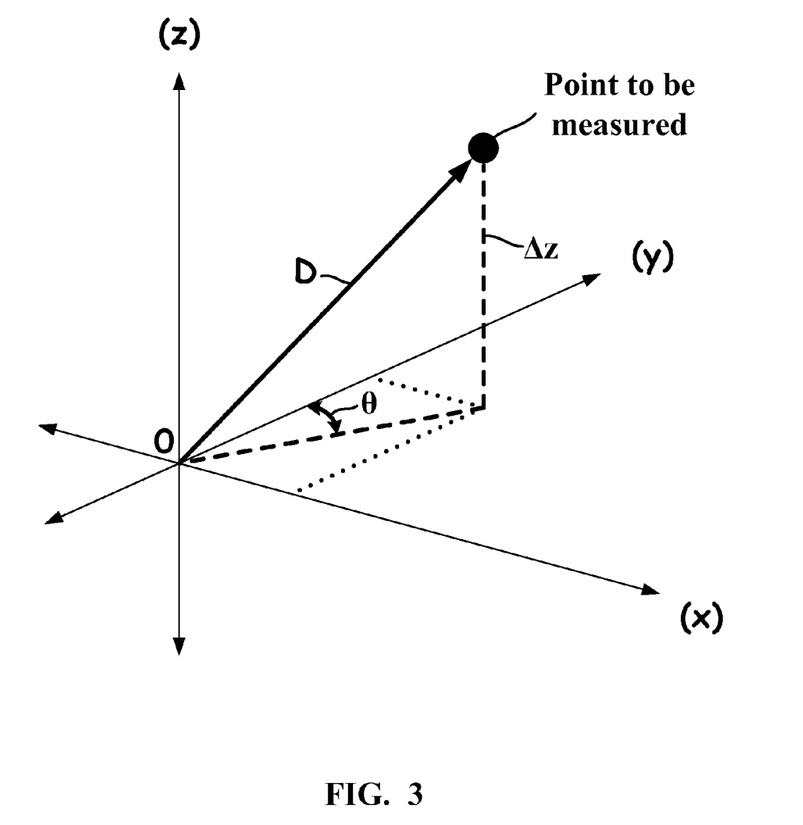
FIG. 3 is a simplified diagram illustrating a method of determining a position of a point using a survey instrument in accordance with an embodiment of the invention.

FIG. 3 is a simplified diagram illustrating a method of determining a position of a point using a survey instrument in accordance with an embodiment of the invention. FIG. 3 illustrates an instrument coordinate system having orthogonal (x), (y), and (z) axes. The instrument coordinate system has an origin at 0. The origin may be at a center of rotation of the survey instrument (e.g., at optical center 112 illustrated in FIG. 1). The instrument coordinate system may be aligned with the local coordinate system or a transformation may be determined between the instrument coordinate system and the local coordinate system in accordance with known techniques. This allows positions measured in the instrument coordinate system to be determined in the local coordinate system.

As illustrated in FIG. 3, a point to be measured is located at an angle θ from the (y) axis, at a distance D from the origin, and at an elevation Δz above horizontal axes (x) and (y). In accordance with an embodiment of the invention, the point to be measured can be determined using a survey instrument comprising an integrated optical total station and digital level. For example, the angle θ can be measured using functionality provided by the optical total station portion of the survey instrument, the distance D can be measured using an electronic distance measuring device, and the elevation Δz (e.g., difference in height) can be measured using functionality provided by the digital level portion of the survey instrument. In this manner, position information with increased accuracy can be efficiently provided.

As an example of the increased accuracy, a conventional optical total station has an accuracy of about ±3-5 mm in computing elevation of a point that is a distance of about 100 meters from the optical total station. This accuracy is dependent on the distance, and it is not adequate for some applications (e.g., high-speed railways). Accuracy of the optical total station can be improved by making multiple measurements from different points. For example, the accuracy can be reduced to about ±0.35 mm by performing two measurements from different positions, but this increases measurement time and cost. In contrast, a conventional digital level can make the same elevation measurement from a single position with an accuracy of about ±0.2 mm, and this accuracy is less dependent on the distance. Thus, a survey instrument comprising an integrated optical total station and digital level can provide improved accuracy in elevation, which leads to increased accuracy in determining position information. Further, the increased accuracy can be realized with reduced measurement time and cost compared to conventional techniques.

Figure 4:
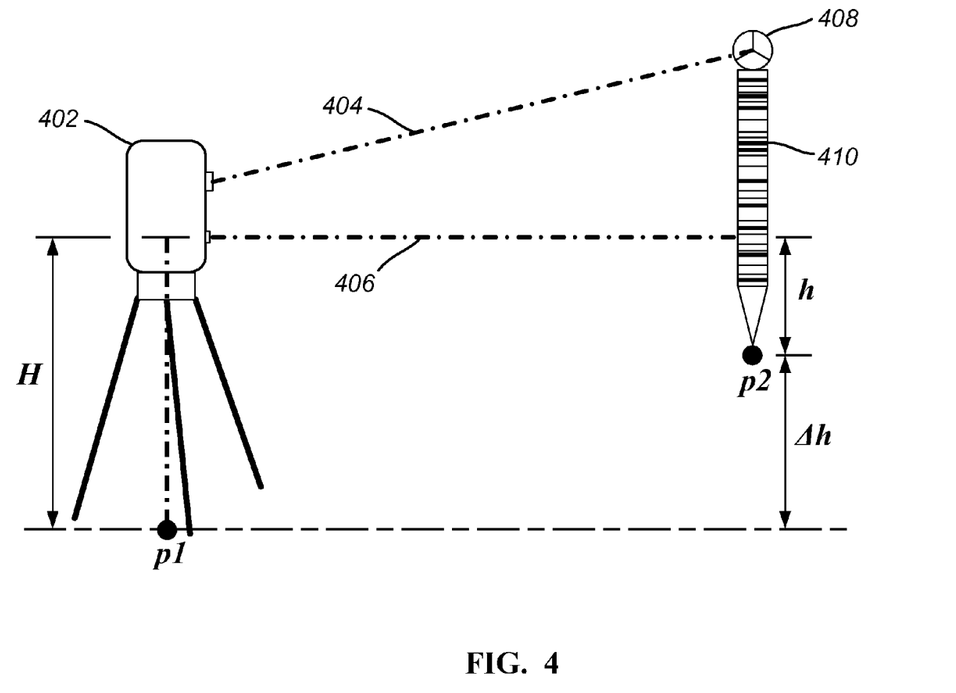
FIG. 4 is a simplified diagram of a survey instrument measuring a difference in height between a horizontal axis of the survey instrument and a point in accordance with an embodiment of the invention.

FIG. 4 is a simplified diagram of a survey instrument 402 measuring a difference in height (h) between a horizontal axis 406 of survey instrument 402 and a point (p2) in accordance with an embodiment of the invention. Survey instrument 402 comprises an integrated optical total station and digital level configured to provide angle, distance, and elevation measurements. As shown in this figure, a leveling staff 410 is positioned relative to point (p2). In this example, leveling staff 410 is positioned at point (p2) (e.g., positioned vertically directly above point (p2)). Survey instrument 402 is configured to determine a difference in height (h) between horizontal axis 406 and point (p2) using conventional digital leveling techniques. For example, survey instrument 402 may be configured to optically determine or recognize a pattern (e.g., a scale or code words) on leveling staff 410 at the same height as horizontal axis 406. The pattern may be used by survey instrument 402 to determine the difference in height (h) between horizontal axis 406 and point (p2).

In some embodiments, the difference in height (h) may be determined relative to a point having a known elevation in a local coordinate system. In FIG. 4, for example, the difference in height (h) may be determined relative to a point (p1). In this example, survey instrument 402 is positioned at a known height (H) above point (p1). A vertical axis (e.g., support axis 106 in FIG. 1 or support axis 206 in FIG. 2) of survey instrument 402 may be aligned with point (p1). The known height (H) may be a distance between point (p1) and a horizontal axis of survey instrument 402. For example, the known height (H) may be a distance between point (p1) and a horizontal axis of a second telescope of survey instrument 402 (e.g., horizontal axis 118 of FIG. 1 or horizontal axis 228 of FIG. 2). Alternatively, in configurations where survey instrument 402 has a single telescope, the known height (H) may be a distance between point (p1) and a horizontal axis of the telescope (e.g., elevation axis 108 of FIG. 1 or elevation axis 208 of FIG. 2). In either situation, the known height (H) and the difference in height (h) may be used to determine an elevation (Δh) of point (p2) relative to point (p1) using the equation:

$$\Delta h = H - h \qquad \text{Equation (1)}$$

In some embodiments, leveling staff 410 may include a target 408. Survey instrument 402 may be a robotic survey instrument configured to automatically locate target 408 using image sensors configured to recognize a particular pattern or surface characteristic associated with target 408. In an embodiment, survey instrument 402 may measure a distance 404 between the survey instrument 402 and target 408 using an electronic distance measuring device. Alternatively, survey instrument may measure a distance along horizontal axis 406 between survey instrument 402 and leveling staff 410 or a distance between survey instrument 402 and point (p2) 412. One of ordinary skill in the art would recognize many variations, modifications, and alternatives.

Figure 5:
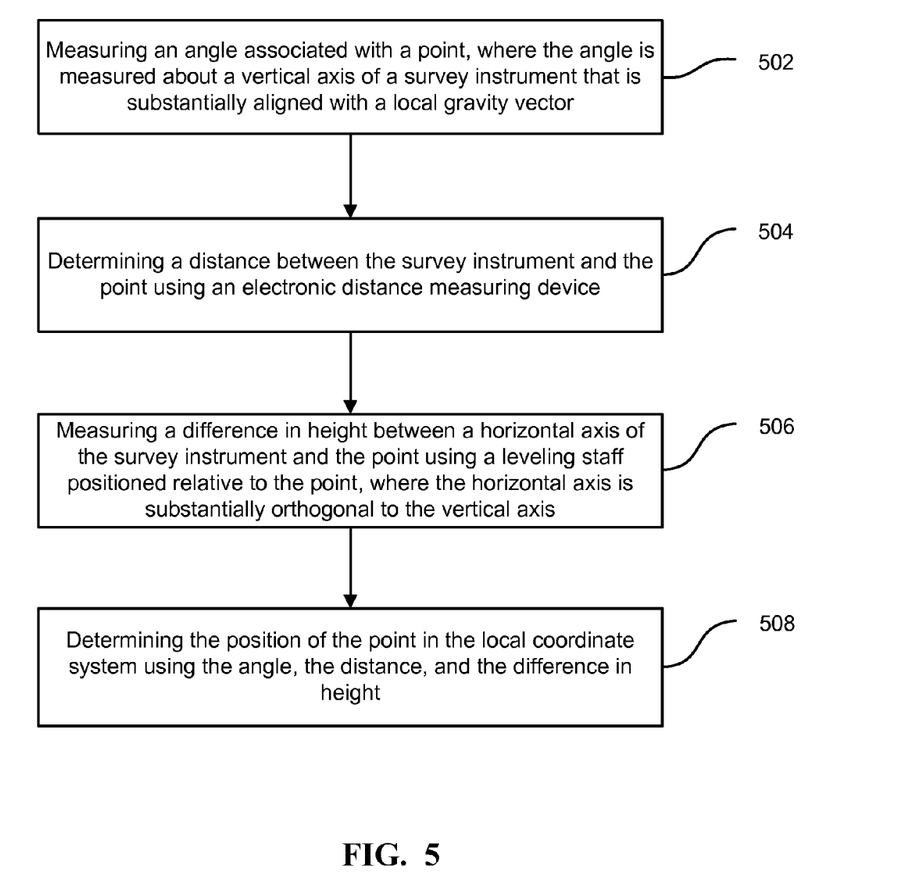
FIG. 5 is a simplified flowchart illustrating an exemplary method of determining a position of a point in a local coordinate system using a survey instrument comprising an integrated optical total station and digital level in accordance with an embodiment of the invention.

FIG. 5 is a simplified flowchart illustrating an exemplary method of determining a position of a point in a local coordinate system using a survey instrument comprising an integrated optical total station and digital level in accordance with an embodiment of the invention. The method includes measuring an angle associated with the point, where the angle is measured about a vertical axis of the survey instrument that is substantially aligned with a local gravity vector (502). The vertical axis of the survey instrument may be aligned with the local gravity vector using conventional surveying techniques. In an embodiment, the angle about the vertical axis may be determined using functionality provided by the optical total station portion of the survey instrument.

The method also includes determining a distance between the survey instrument and the point using an electronic distance measuring device (504). The distance between the survey instrument and the point may be measured directly, or the distance may be determined based on a measured distance between the survey instrument and a leveling staff (or a target on or coupled to the leveling staff).

The method also includes measuring a difference in height between a horizontal axis of the survey instrument and the point using the leveling staff positioned relative to the point, where the horizontal axis is substantially orthogonal to the vertical axis (506). The horizontal axis may be aligned substantially orthogonal to the vertical axis by leveling the survey instrument using conventional surveying techniques. The horizontal axis may correspond to elevation axis 108 or horizontal axis 118 in FIG. 1 depending on the configuration of the survey instrument as described above. In an embodiment, the leveling staff may be positioned at the point, and the difference in height may be determined using functionality provided by the digital level portion of the survey instrument. Measuring the difference in height may include determining a first difference in height between the horizontal axis of the survey instrument and a first point having a known elevation in the local coordinate system, and determining a second difference in height between the horizontal axis of the survey instrument and the point.

The method also includes determining the position of the point in the local coordinate system using the angle, the distance, and the difference in height (508). In an embodiment, determining the position of the point in the local coordinate system includes determining a position of the point in an instrument coordinate system using the angle, the distance, and the difference in height. The position of the point in the local coordinate system may be determined using the position of the point in the instrument coordinate system and a transformation between the instrument coordinate system and the local coordinate system.

Figure 6:
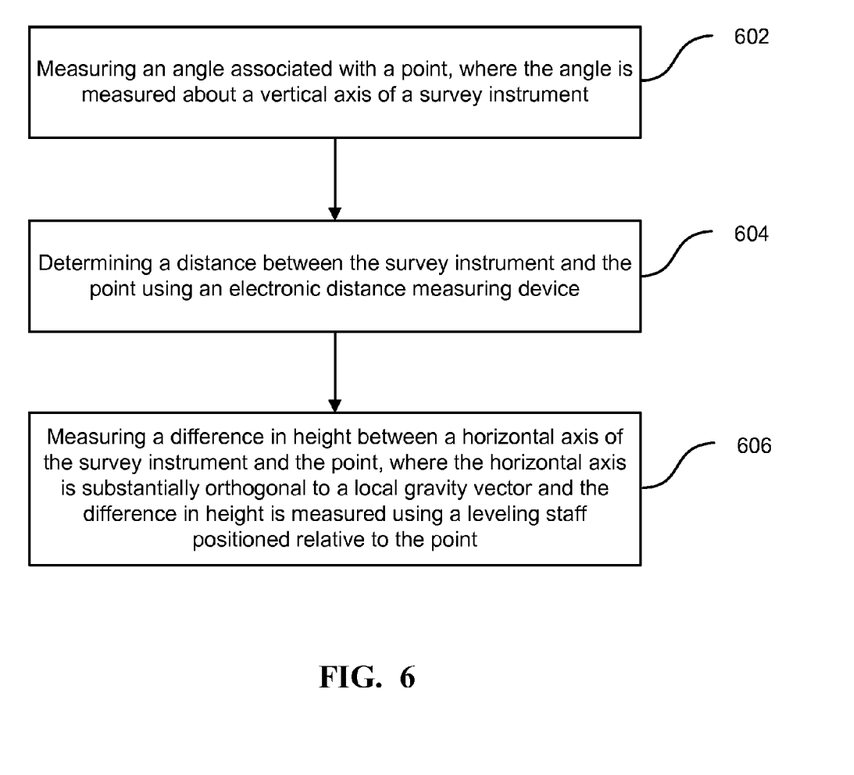
FIG. 6 is a simplified flowchart illustrating an exemplary method of determining an angle, distance, and elevation of a point using a survey instrument comprising an integrated optical total station and digital level in accordance with an embodiment of the invention.

FIG. 6 is a simplified flowchart illustrating an exemplary method of determining an angle, distance, and elevation of a point using a survey instrument comprising an integrated optical total station and digital level in accordance with an embodiment of the invention. The method includes measuring an angle associated with the point, where the angle is measured about a vertical axis of the survey instrument (602). The vertical axis of the survey instrument may be aligned with a local gravity vector using conventional surveying techniques.

The method also includes determining a distance between the survey instrument and the point using an electronic distance measuring device (604). In an embodiment, determining the distance between the survey instrument and the point includes measuring a first distance between the survey instrument and a target coupled to the leveling staff and determining the distance between the survey instrument and the point. In another embodiment, determining the distance between the survey instrument and the point includes directly measuring the distance between the survey instrument and the point.

The method also includes measuring a difference in height between a horizontal axis of the survey instrument and the point, where the horizontal axis is substantially orthogonal to a local gravity vector and the difference in height is measured using a leveling staff positioned relative to the point (606). The horizontal axis may be aligned substantially orthogonal to the local gravity vector by leveling the survey instrument using conventional surveying techniques. The horizontal axis may correspond to elevation axis 108 or horizontal axis 118 in FIG. 1 depending on the configuration of the survey instrument as described above. In an embodiment, the leveling staff may be positioned at the point. Measuring the difference in height may include optically recognizing a pattern on the leveling staff at a same height as the horizontal axis of the survey instrument.

It should be appreciated that the specific steps illustrated in FIGS. 5-6 provide particular methods of determining a position of a point using a survey instrument comprising an integrated optical total station and digital level in accordance with embodiments of the present invention. The steps outlined above may be continuously repeated by system software. Other sequences of steps may also be performed according to alternative embodiments. For example, the steps outlined above may be performed in a different order. Moreover, the individual steps illustrated in FIGS. 5-6 may include multiple sub-steps that may be performed in various sequences as appropriate to the individual step. Furthermore, additional steps may be added or removed depending on the particular application. One of ordinary skill in the art would recognize many variations, modifications, and alternatives.

Figure 7:
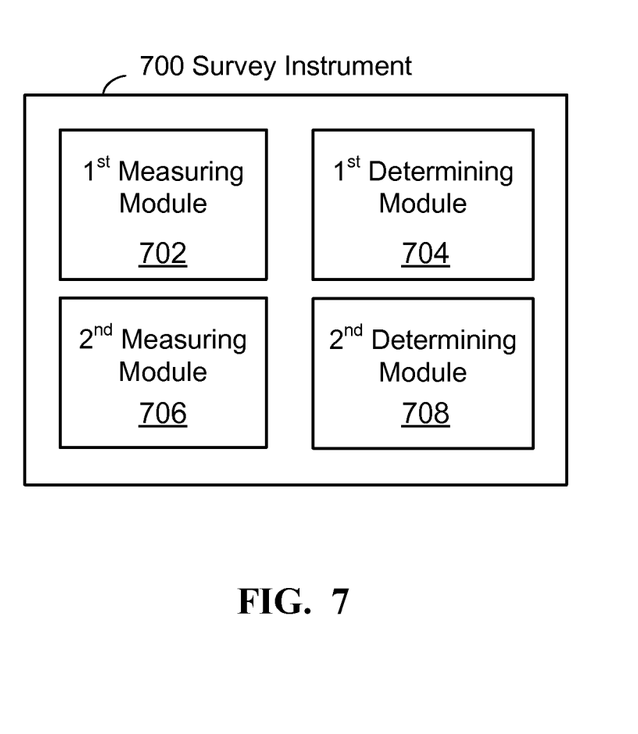
FIG. 7 is a simplified block diagram of a survey instrument in accordance with an embodiment of the invention.

FIG. 7 is a simplified block diagram of a survey instrument 700 in accordance with an embodiment of the invention. Survey instrument 700 includes a first measuring module 702 configured to measure an angle associated with a point about a vertical axis of the survey instrument 700. Survey instrument 700 also includes a first determining module 704 configured to determine a distance between survey instrument 700 and the point using an electronic distance measuring device. Survey instrument 700 also includes a second measuring module 706 configured to measure a difference in height between a horizontal axis of survey instrument 700 and the point using a leveling staff positioned relative to the point. The horizontal axis may be arranged substantially orthogonal to a local gravity vector. The horizontal axis may correspond to elevation axis 108 or horizontal axis 118 in FIG. 1 depending on the configuration of survey instrument 700 as described above. Survey instrument 700 also includes a second determining module 708 configured to determine the position of the point in the local coordinate system using the angle, the distance, and the difference in height.

Survey instrument 700 typically includes familiar processing components such as one or more processors and tangible media for storage, I/O devices, and a system bus interconnecting the components. RAM and disk drives are examples of tangible media for storage of data and computer programs. Other types of tangible media include magnetic storage media, optical storage media, semiconductor memories such as flash memory, networked storage devices, and the like. Survey instrument 700 may also include an operating system.

It should be appreciated that each of the modules described above with regard to FIG. 7 may be embodied in hardware, as a set of instructions embodied as code on a non-transitory computer readable medium, as a set of instructions embodied as code in memory or survey instrument 700, as a set of instructions embodied within an application specific integrated circuit, or the like. One of ordinary skill in the art would recognize many variations, modifications, and alternatives.

It should be noted that the methods and apparatuses discussed throughout the specification are provided merely as examples. Various embodiments may omit, substitute, or add various steps or components as appropriate. For instance, it should be appreciated that features described with respect to certain embodiments may be combined in various other embodiments. Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other mediums capable of storing, containing, or carrying instructions or data.

What is claimed is:

1. A method of determining a position of a point in a local coordinate system using a survey instrument comprising an integrated optical total station and digital level, the method comprising:
    measuring an angle associated with the point, the angle measured about a vertical axis of the survey instrument, the vertical axis being substantially aligned with a local gravity vector;
    determining a distance between the survey instrument and the point using an electronic distance measuring device;
    measuring a difference in height between a horizontal axis of the survey instrument and the point using a leveling staff positioned relative to the point, the horizontal axis being substantially orthogonal to the vertical axis; and
    determining the position of the point in the local coordinate system using the angle, the distance, and the difference in height.

2. The method of claim 1 wherein the leveling staff is positioned at the point.

3. The method of claim 1 wherein determining the position of the point in the local coordinate system comprises:
    determining a position of the point in an instrument coordinate system using the angle, the distance, and the difference in height; and
    determining the position of the point in the local coordinate system using the position of the point in the instrument coordinate system and a transformation between the instrument coordinate system and the local coordinate system.

4. The method of claim 1 wherein measuring the difference in height between the horizontal axis of the survey instrument and the point comprises optically determining a pattern on the leveling staff at a same height as the horizontal axis of the survey instrument.

5. The method of claim 1 wherein determining the difference in height between the horizontal axis of the survey instrument and the point comprises:
    determining a first difference in height between the horizontal axis of the survey instrument and a first point having a known elevation in the local coordinate system; and
    determining a second difference in height between the horizontal axis of the survey instrument and the point.

6. The method of claim 1 wherein the angle about the vertical axis of the survey instrument is determined using functionality provided by the optical total station portion of the survey instrument.

7. The method of claim 1 wherein the difference in height between the horizontal axis of the survey instrument and the point is determined using functionality provided by the digital level portion of the survey instrument.

8. The method of claim 1 further comprising stationing the survey instrument at a first location.

9. The method of claim 1 further comprising positioning the survey instrument at a known height above a survey monument having known coordinates in the local coordinate system.

10. A method of determining an angle, distance, and elevation of a point using a survey instrument comprising an integrated optical total station and digital level, the method comprising:
    measuring an angle associated with the point, the angle measured about a vertical axis of the survey instrument;
    determining a distance between the survey instrument and the point using an electronic distance measuring device; and
    measuring a difference in height between a horizontal axis of the survey instrument and the point, the horizontal axis substantially orthogonal to a local gravity vector and the difference in height measured using a leveling staff positioned relative to the point.

11. The method of claim 10 wherein the leveling staff is positioned at the point.

12. The method of claim 10 wherein determining the distance between the survey instrument and the point comprises measuring a first distance between the survey instrument and a target coupled to the leveling staff and determining the distance between the survey instrument and the point.

13. The method of claim 10 wherein determining the distance between the survey instrument and the point comprises measuring the distance between the survey instrument and the point.

14. The method of claim 10 wherein measuring the difference in height between the horizontal axis of the survey instrument and the point comprises optically recognizing a pattern on the leveling staff at a same height as the horizontal axis of the survey instrument.

15. The method of claim 10 further comprising aligning the survey instrument with the local gravity vector.

16. A survey instrument comprising an integrated optical total station and digital level, the survey instrument configured to determine a position of a point in a local coordinate system, comprising:
- a first measuring module configured to measure an angle associated with the point about a vertical axis of the survey instrument;
- a first determining module configured to determine a distance between the survey instrument and the point using an electronic distance measuring device;
- a second measuring module configured to measure a difference in height between a horizontal axis of the survey instrument and the point using a leveling staff positioned relative to the point, the horizontal axis substantially orthogonal to a local gravity vector; and
- a second determining module configured to determine the position of the point in the local coordinate system using the angle, the distance, and the difference in height.

17. The survey instrument of claim 16 wherein the second measuring module is further configured to optically determine a pattern on the leveling staff at a same height as the horizontal axis of the survey instrument, the pattern on the leveling staff used to determine the difference in height between the horizontal axis of the survey instrument and the point.

18. The survey instrument of claim 16 wherein the first measuring module comprises a telescope coupled to an angle measurement device.

19. The survey instrument of claim 16 wherein the second measuring module comprises:
- a pendulum configured to align the horizontal axis of the survey instrument substantially orthogonal to the local gravity vector; and
- an image sensor configured to identify a pattern on the leveling staff, the pattern on the leveling staff used to determine the difference in height between the horizontal axis of the survey instrument and the point.

20. The survey instrument of claim 16 wherein the first measuring module is configured to rotate about the horizontal axis and the vertical axis of the survey instrument, and the second measuring module is configured to rotate about only the vertical axis of the survey instrument.

* * * * *